United States Patent
Ray et al.

(10) Patent No.: US 9,235,592 B2
(45) Date of Patent: Jan. 12, 2016

(54) METHOD AND SYSTEM FOR MULTI-BLOCK OVERLAP-DETECTION IN A PARALLEL ENVIRONMENT WITHOUT INTER-PROCESS COMMUNICATION

(71) Applicant: Wal-Mart Stores, Inc., Bentonville, AR (US)

(72) Inventors: Andrew Benjamin Ray, Bentonville, AR (US); Nathaniel Philip Troutman, Seattle, WA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 316 days.

(21) Appl. No.: 13/871,940

(22) Filed: Apr. 26, 2013

(65) Prior Publication Data

US 2014/0324790 A1    Oct. 30, 2014

(51) Int. Cl.
*G06F 17/30* (2006.01)
(52) U.S. Cl.
CPC .............................. *G06F 17/30156* (2013.01)
(58) Field of Classification Search
None
See application file for complete search history.

(56) References Cited

U.S. PATENT DOCUMENTS

| | | | |
|---|---|---|---|
| 6,009,424 A | 12/1999 | Lepage | |
| 6,122,628 A | 9/2000 | Castelli | |
| 6,175,835 B1 | 1/2001 | Shadmon | |
| 6,208,993 B1 | 3/2001 | Shadmon | |
| 6,988,093 B2 | 1/2006 | Pic | |
| 7,549,052 B2 | 6/2009 | Haitsma | |
| 2010/0174688 A1* | 7/2010 | Anumakonda et al. | 707/692 |

* cited by examiner

*Primary Examiner* — Anh Tai Tran
(74) *Attorney, Agent, or Firm* — Bryan Cave LLP

(57) ABSTRACT

Techniques for avoiding duplicate comparisons while comparing customer records to identify linked customer records pertaining to a single customer entity are provided. The techniques include the computer system comparing a first electronic customer record with a second electronic customer record to determine if the first electronic customer record and the second electronic customer record pertain to a single customer entity if the computer system identifies a common blocker key corresponding to a selected blocker from a data field in the first electronic customer record and from a data field in the second electronic customer record and if the computer system does not identify a common blocker key corresponding to an additional lower order blocker from another data field in the first electronic customer record and from a data field in the second electronic customer record.

20 Claims, 9 Drawing Sheets

METHOD AND SYSTEM FOR MULTI-BLOCK OVERLAP-DETECTION IN A PARALLEL ENVIRONMENT WITHOUT INTER-PROCESS COMMUNICATION

BACKGROUND INFORMATION

1. Field of the Disclosure

The present invention relates to computerized record processing systems and more particularly to techniques for avoiding redundant comparisons of customer records when using records blocking.

2. Background

The computation time required for processing certain types of data objects is high and increases dramatically as the number of objects increases. For example, comparing records to link associated records requires comparing a pair of records. Each such comparison is computationally expensive as it requires significant processing time. Additionally, as the number records increases, the number of comparisons that need to be conducted may grow exponentially. Comparing records to identify associated records requires significant computing power and is a slow process.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
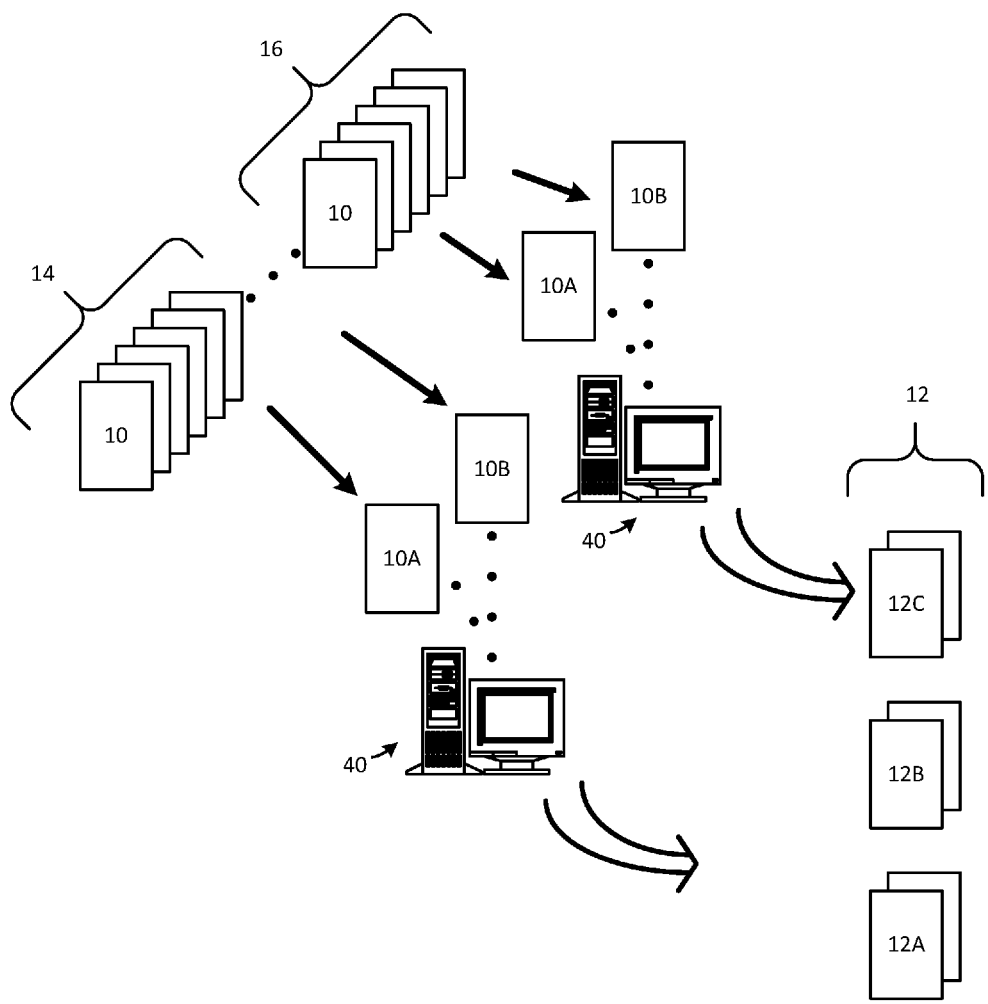
FIG. 1 is a schematic drawing of a computer system used to compare and link customer records.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages. In selected examples, a computer-readable medium may comprise any non-transitory medium that can contain, store, communicate, propagate, or transport the program for use by or in connection with the instruction execution system, apparatus, or device.

Examples may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on one or more clients, servers, or combinations or sub-combinations thereof. In selected embodiments, one or more clients and servers may be positioned remotely with respect to one another. Accordingly, such nodes may be connected to one another through any type of network, including a local area network (LAN) or a wide area network (WAN), or the connection may be made through the Internet using an Internet Service Provider.

Referring to FIG. 1, an example computer system 40 may utilize multi-block overlap detection in combination with blocking, multi-blocking, and focused multi-blocking to increase the rate of identifying linked records 12A, 12B, 12C among customer records 10 while decreasing the occurrence of duplicated records analysis thereby reducing the computational time required to analyze the records 10. In one example, stores may generate many customer records 10. Multiple entry points where customers may provide information and create a customer record 10 may create multiple groups 14, 16 of customer records and may create many instances where multiple records 10 belong to the same customer. A computer system 40 (which may include multiple computers, processors, or nodes) may be used to analyze the customer records 10 and identify links between records; identifying linked records 12A, 12B, 12C which belong to the same customer.

Identifying linked customer records allows the computer system 40 to create a more complete understanding of customer preferences, history, etc. This allows the computer system to tailor promotions or communications to better match the customer preferences and allow a store to better serve the customers.

A brute force comparison of the customer records requires significant computational time and is not practical. Each record must be compared with every other record to determine if these belong to the same person. A brute force comparison of N records requires $N^2$ comparisons. Each comparison of a pair of customer records requires comparison of multiple data fields within each record.

Rather than performing such a brute force comparison, a computer system 40 may analyze the customer records 10 using a blocking, multi-blocking, or focused multi-blocking technique in combination with multi-block overlap detection. Rather than randomly select records 10A, 10B to compare and analyze, the computer system may systematically select records according to algorithms which provide an increased likelihood of identifying linked records 12. The computer system 40 may apply blocking, multi-blocking, and/or focused multi-blocking to the records 10 to identify records for comparison. Blocking assigns a key to a customer record 10 based on attributes of that record. Blocking assigns a key to the record 10 based on data found within the record which is associated with the customer who created the record 10. For example, a block of 'zip code' may be applied to a record 10, generating a block key of the zip code (e.g. 90210). The block key may be joined with the customer record or record identification in creating a value pair (such as 90210; record) and records with the same blocking keys (such as the same zip codes) may be compared with each other to determine if these records belong to the same customer entity.

A block (or blocker) may indicate a single data value of interest within a customer record, such as a zip code or the first letter of a last name. Focused blocks may contain multiple data values of interest within the records 10. For example, a focused block of 'zip code' and 'double metaphone of last name' may be applied to the records, creating focused blocking keys of the zip code and double metaphone and associating these keys with the record 10. Double metaphone is an algorithm which converts a name into a simplified phonetic representation. The computer system 40 may then compare records 10A, 10B which contain the same zip code and phonetically equivalent last names. Such records 10A, 10B are much more likely to be linked records than records chosen at random as they have been selected for comparison by virtue of containing overlapping data.

Moreover, the computer system 40 may perform comparisons of the records 10 using multiple different blocks and focused blocks, referred to as focused multi-blocking. In this manner, records are compared using multiple different blocks and/or focused blocks and the likelihood of identifying the linked records 12 is increased while the likelihood of not identifying linked records 12 present in the customer records 10 is low.

Computational time is saved by performing focused multi-blocking. For N records, brute force analysis would perform $N^2$ comparisons. If a focused block resulting in N/2 records is used for comparing records 10, $(N/2)^2$ comparisons ($\frac{1}{4}*N^2$ comparisons) are performed. One quarter as many comparisons are performed. If two comparisons using different focused blocks are performed, $\frac{1}{2}*N^2$ comparisons are performed. If three comparisons using different focused blocks are performed, $\frac{3}{4}*N^2$ comparisons are performed. Many focused blocks will result in less than N/2 associated records. It can be seen that even where two, three, or more focused blocks are used in comparing the records 10, fewer comparisons may be performed than would be necessary to simply compare all records 10 using brute force.

In many examples, however, the number of customer records 10 which may be analyzed and compared is extremely large. A store with many retail locations across a nation as well as online ordering and other purchasing options may generate millions if not billions of customer records 10. The customer records 10 may include purchase transactions, customer profiles, orders, contest entries, etc. With such a large number of customer records, it is often desirable to perform analysis using multiple different blocks. The computer system 40 may then apply multi-block overlap detection to avoid repeating comparison of pairs of customer records which have previously been compared in connection with another blocking key.

Moreover, comparison of such a large number of customer records is advantageously, and often necessarily, performed in a parallel computing environment. Significant gains in computational efficiency may be achieved by eliminating comparison of pairs of records which have already been compared or which are scheduled to be compared by another computer, processor, or node. Moreover, significant gains in computational efficiency may be achieved by allowing the various computers, processors, or nodes to work more independently and to minimize the necessity for a computer, processor, or node to interact with a supervisory computer or a history of previous comparisons to determine if a particular comparison of customer records has already been performed.

The computer system may achieve multi-block overlap detection whereby blocking keys are ordered and handled in accordance with a predetermined algorithm. The computer system may determine if a pair of customer records has been previously compared (or scheduled to be compared by another computer, processor, or node) in connection with a prior blocking key from the records themselves and from an ordered listing of blocking keys. Where a pair of customer records has not been compared previously, the computer system compares these records to determine if they present linked records. If the pair of customer records indicates prior comparison in connection with another blocking key, the computer system does not compare these records in combination with the current blocking key. Because the multi-block overlap detection prevents duplicate comparisons of customer records, additional blockers or focused blockers may be applied to the customer records. This results in additional possible blocking keys associated with each customer record and increased likelihood of successful record comparisons and identification of linked records 12 without an increasing number of duplicate record comparisons.

Figure 2:
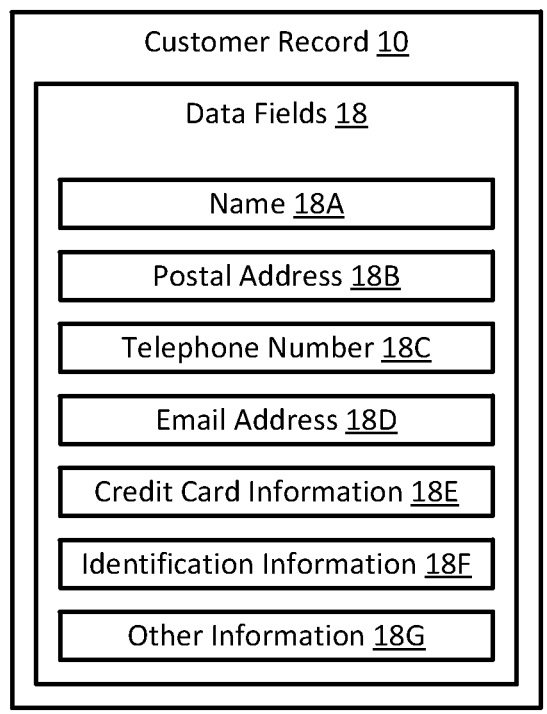
FIG. 2 is a schematic drawing of a customer record.

Referring to FIG. 2, computerized records 10 processed by a computer system 40 may have any suitable form or content. In selected examples, records 10 may correspond to the activities of a business, information related to a business, activities of customers of one or more businesses, information related to customers of one or more businesses, or the like or a combination or sub-combination thereof. For example, records 10 may correspond to or comprise customer profiles.

A computerized record 10 may include or contain one or more data fields 18. The nature of the data fields 18 may correspond to the nature or purpose of a record. For example, a record 10 that is embodied as a store customer record 10 or customer profile may include one or more data fields 18 populated with contact information, demographic information, geographic information, and psychographic characteristics, buying patterns, creditworthiness, purchase history, or the like or a combination or sub-combination thereof. Accordingly, in one example, a record 10 may include or contain data fields 18 populated with one or more names 18A, postal addresses 18B, telephone numbers 18C, email addresses 18D, credit card information 18E (e.g., codes or index information corresponding to credit card data), identification information 18F (e.g., account numbers, customer numbers, membership numbers, or the like), other information 18G as desired or necessary, or the like.

Records 10 in accordance with the present invention may be processed in any suitable manner. In selected embodiments, it may be desirable to identify one or more links between two or more records 10 to identify linked records 12. This may allow a store to better serve its customers. The store may better identify a customer's purchasing habits and may offer discounts or promotions which are better suited to a particular customer.

Figure 3:
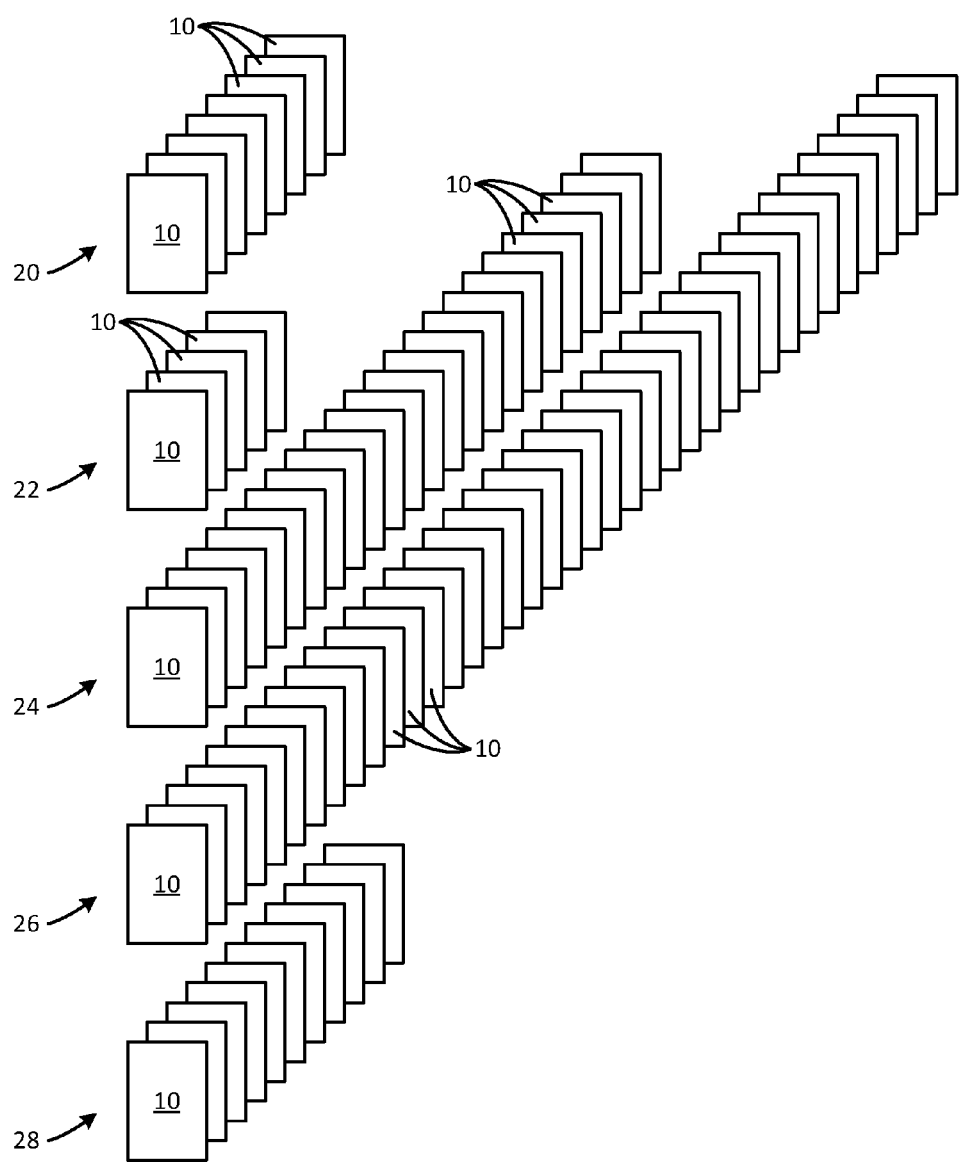
FIG. 3 is a schematic drawing of groups of customer records.

As indicated in FIG. 3, customer records 10 corresponding to customer profiles associated with a single customer may be generated by different sources. Multiple customer records 10 may be related in other ways, such as pertaining to the same household or business. Accordingly, records 10 may be compared to identify those that correspond to the same individual, family, household, business, or the like. Such customer records 10 may then be linked 12, enabling greater benefit to be obtained thereby. Linked records may be generally referred to as pertaining to the same customer entity. In this manner, a customer entity may refer to a customer, a household, a business, etc.

For example, a group 20 of records 10 may correspond to online purchases. A group 22 of records 10 may correspond to online profiles created on a store website. A group 24 of records 10 may correspond to membership in a warehouse club. Still another group 26 of records 10 may correspond to purchases in a brick-and-mortar retail store. Another group 28 of records 10 may correspond to entry into a promotion. Selected customers and/or households may correspond to records 10 from one or more such sources, and may correspond to multiple records within any of such sources. However, there may not be any hard link (e.g., unifying or universal identification number) linking such records 10 together as belonging to a single customer. Moreover, it may be desirable to associate records together within a selection larger than a single customer, such as by linking records which are associated with a single household or business. Accordingly, fuzzy logic may be used to identify those records 10 that correspond to the same individual, household, or the like. Once linked together, those linked records 12 may provide a more complete picture of the individual or household and, as a result, be more useful to the store in serving the customer.

Figure 4:
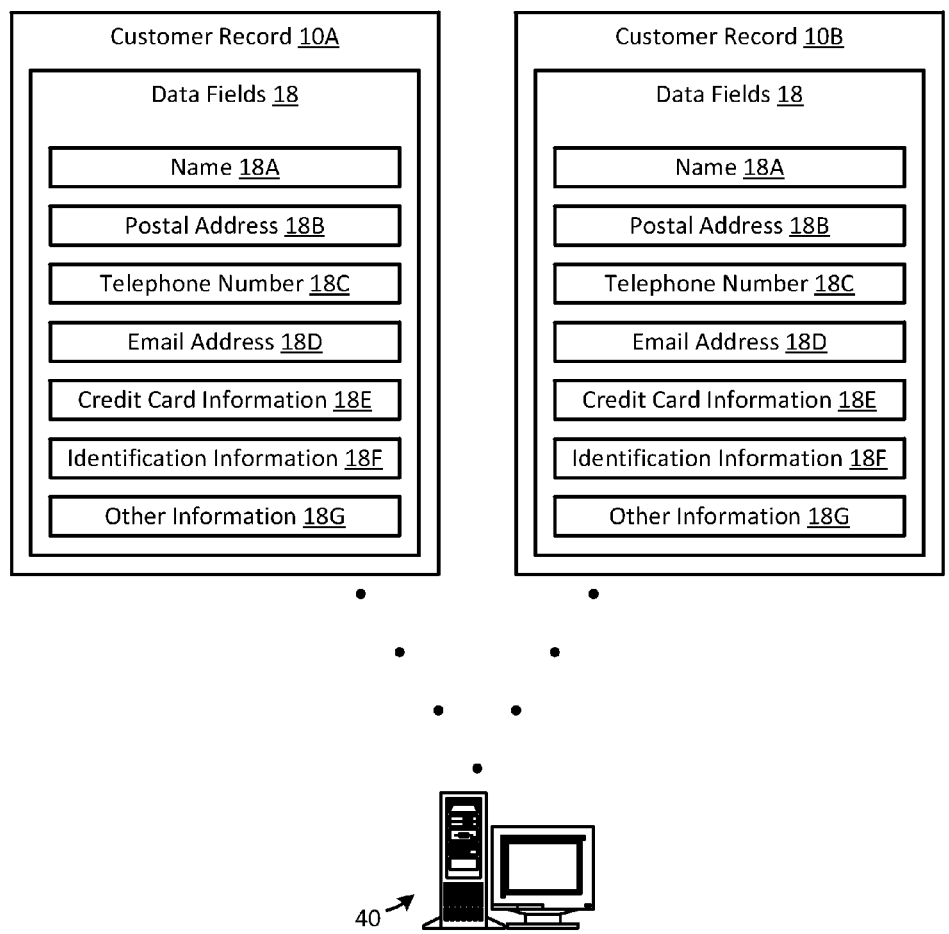
FIG. 4 is a schematic drawing of a computer comparing customer records.

Referring to FIG. 4, linking two or more records 10 together may require comparing pairs of records 10A, 10B. As the number records 10 increases, the number of comparisons may grow exponentially. Moreover, each comparison of two records 10A, 10B may be computationally expensive as it may require comparison of one, multiple, or all data fields 18 within the records 10A, 10B. Accordingly, the computer system 40 may employ multi-block overlap detection in order to limit the number of duplicate comparisons which are performed in the process of blocking, multi-blocking, and focused multi-blocking (often referred to collectively as focused blocking for clarity) and efficiently process one or more large groups of records 10 (e.g., one or more of groups 20, 22, 24, 26, 28). In many examples, it may desirable to compare all available records 10 from all groups 20, 22, 24, 26, 28 to identify linked records 12.

Figure 5:
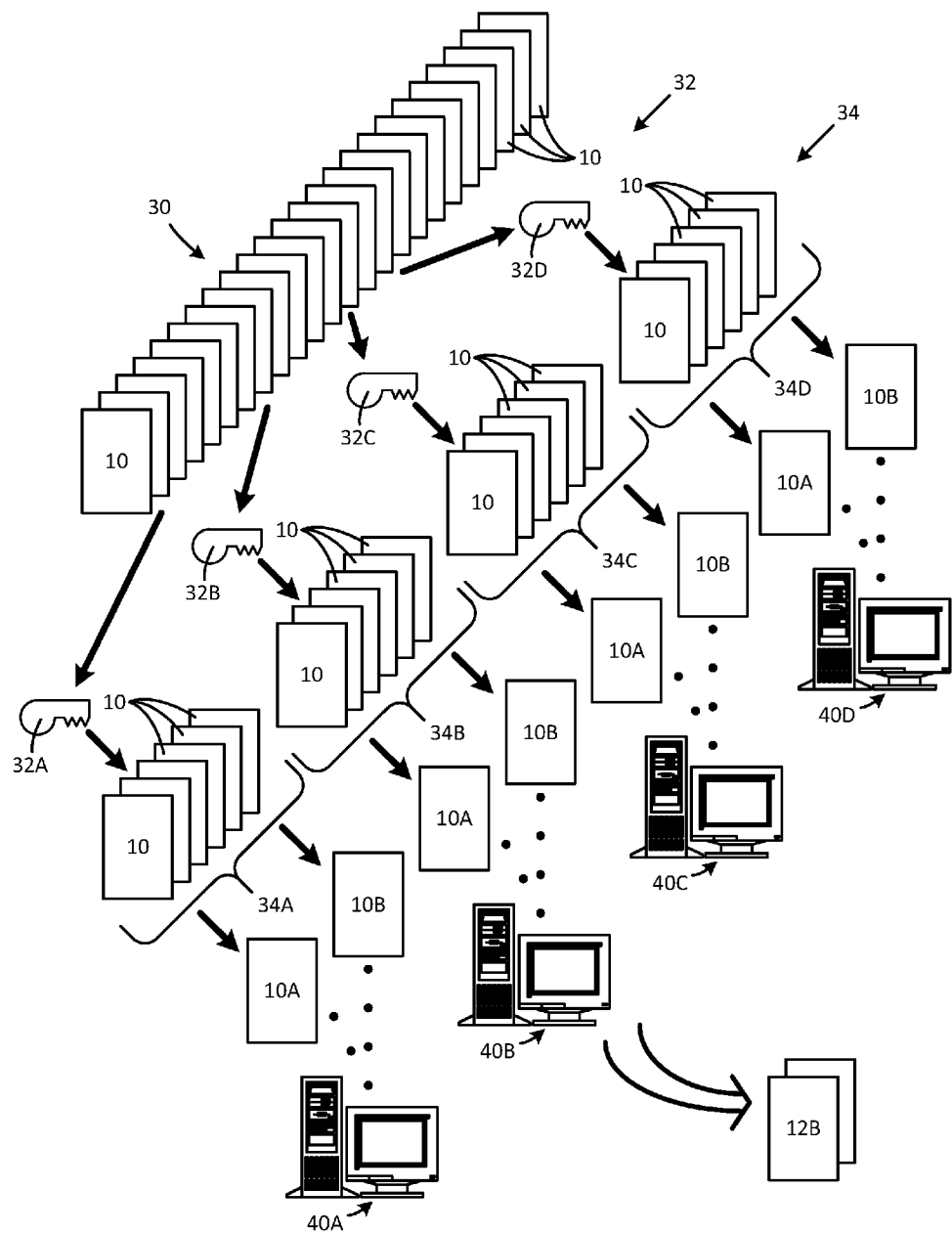
FIG. 5 is a schematic drawing of groups of customer records and a computer system.

As illustrated in FIG. 5, the computer system 40 may control the number of comparisons which are performed on a target group 30 of records 10 by applying a focused blocker to the records 10 to produce block keys 32 and separate the group 30 of records 10 into a plurality of smaller focused groups 34 of records 10. Focused blocking may include assigning one or more keys 32 to each record 10 based on one or more data attributes thereof and responsive to one or more focused blockers. For example, if each record 10 of a group 30 corresponds to or comprises a customer profile, focused blocking may comprise assigning a key 32 to each record 10 based on customer attributes such as zip code and first letter of last name, etc. as well as combinations thereof. Comparisons may then only be made between records 10A, 10B corresponding to the same focused group 34, thereby reducing the total number of comparisons that need to be performed and increasing the likelihood that any comparison returns linked records 12.

Since comparisons between records 10 are independent (e.g., can be conducted without inter-process communication), record linkage may be performed in a parallel computing environment. Accordingly, one or more computer systems 40 may compare records 10A, 10B from the focused groups 34. For example, a computer system 40B may compare records 10A, 10B from focused group 34B, resulting in linked records 12B. Moreover, multiple computer systems 40 (or multiple computers, processors, or nodes) may be used to accomplish different aspects of comparing the records 10.

For example, one computer system 40 may generate or provide the focused blockers. One or more other computer systems 40 may receive one or more focused blockers and process the group of records 30 according to the focused blockers to produce focused block keys 32A, 32B, 32C, 32D associated with the records 10 and to generate focused record groups 34A, 34B, 34C, 34D. One or more other computer systems 40A, 40B, 40C, 40D, may process records 10A, 10B, from the focused groups 34A, 34B, 34C, 34D to identify linked records 12. In this manner, multiple computer systems 40 may be used to quickly and efficiently process a large target group 30 of records 10 to identify linked records 12. Particularly, different computers, processors, or nodes may each compare customer records 10 from different focused groups 34.

When each record 10 is first processed (e.g., in a first pass), a computer system 40 may generate tuples comprising or identifying a focused block key 32 and a corresponding record 10. Records 10 may then be grouped based on the block keys 32 assigned thereto. In a second pass, a computer system 40 may take the focused groups 34 of records 10 and compare pairs of records from the focused group 34 to identify linked records 12. Multiple focused block keys 32 may be used according to the requirements in comparing the records 10. According to the types of linked records 12 which should be identified, one or more focused blockers resulting in one or more focused block keys 32 may be used in comparing the target group 30 of records 10.

Multi-block overlap detection may allow for efficient comparison of records 10 by eliminating duplicative comparisons. When a computer system 40 analyzes and compares a target group 30 of customer records 10, multiple blockers or focused blockers may be used, resulting in zero or more blocking keys or focused blocking keys 32 for each customer record 10. The computer system 40 may order the focused blocking keys 32 and may associate all pertinent blocking keys with the record. In one example, the computer system 40 may order the focused blocking keys lexigraphically.

In one example, the following blockers may be used in analyzing customer records 10: phone number, email address, customer number, and member number. In the example, the following focused blocking keys may be used in various combinations to analyze and compare the target group 30 of customer records 10: Double metaphone of last name+Zip code, Last name+Zip code, Last name+House Number, and House Number+Zip code. The computer system may order these focused blocking keys 32 lexigraphically in associating blocking keys with the customer record to which they pertain. The example focused blockers below have been referred to as blockers A, B, C, D, etc. and the associated blocking keys below have been identified with reference numerals bearing capital letters 32A, 32B, 32C, 32D, etc. and may be associated with focused group 34A, 34B, 34C, 34D, etc.

---
'Email address' - A
'member number' - B
'zip code' + 'last name' - C
'zip code' + 'house number' - D
---

Figure 6:
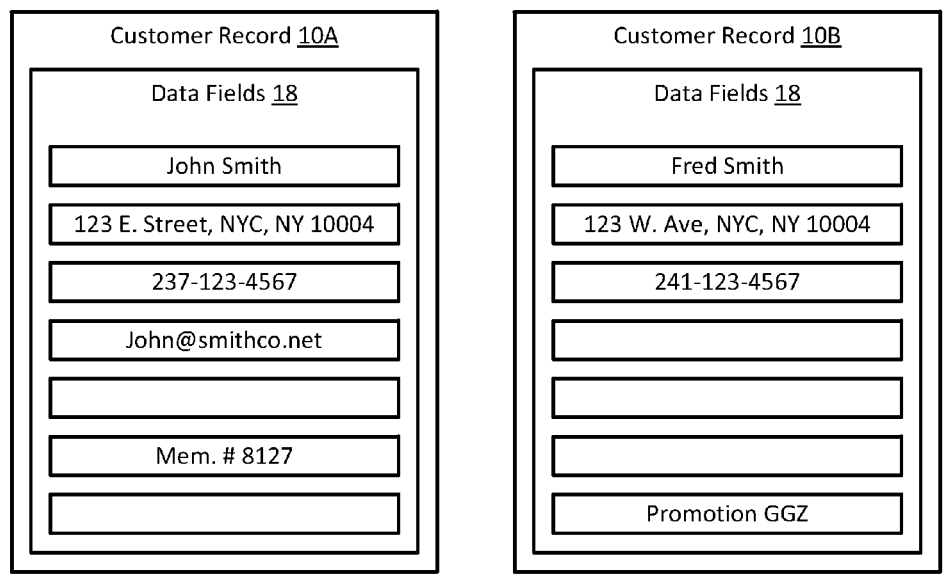
FIG. 6 is a schematic drawing of a pair of customer records for analysis and comparison.

Example customer records 10A and 10B may include customer data as shown in FIG. 6. A computer system 40 may analyze customer record 10A according to the blockers above, determining that the record contains information of the type designated by blockers A, B, C, and D. Analysis of record 10A may result in the following blocking keys:

---
John@smithco.net - 32A
8127 - 32B
10004:Smith - 32C
10004:123 - 32D
---

The blocking keys may be ordered and may also be appended to or associated with records 10A. By way of example, the blocking keys may be formed into a key value pair or key value group. The key value group may include a data string joining blocking keys with a record identification, such as (RecordID, KeyA, KeyB, KeyC, KeyD). According to one example, the key value group may be formed in relation to a computer system 40 performing analysis of a particular blocker and may reference the current blocker and previous blockers to even more readily facilitate determination if records 10A, 10B have been previously compared. In such an example, the key value group may be formed as (KeyN, RecordID, KeyN−1, . . . , Key0) where KeyN represents the blocker/blocking key currently being used to compare customer records, RecordID represents the record, and KeyN−1, . . . , Key0 represent lower ordered keys which will have already been considered or which may have been assigned for consideration by another computer, processor, or node.

Thus, for a computer system 40 analyzing records 10 based on blocker D, customer record 10A may generate a key value group such as (10004:123,Record10A,10004: Smith,8127, John@smithco.not). Similarly, record 10B may generate a key value group such as (10004:123,Record10B,10004: Smith) or (10004:123,Record10B,10004:Smith,Null,Null). These records may have been identified as belonging to a single focused group 34D as they both contain matching values for blocker D. In comparing these records, a computer system 40 may determine that these records may be compared in the context of analyzing blocker D as they contain matching blocker keys 32D.

Before comparison of records 10A, 10B the computer system may perform multi-block overlap detection whereby the computer system 40 determines if these records have been previously compared in the context of analyzing a prior blocker. Thus, the computer system 40 may determine that records 10A, 10B should not be compared in the context of blocker D as these records have already been compared in the context of blocker C, as evidenced by the matching blocker keys 32C (10004:Smith). In this manner, the computer system 40 may generate and review a list of blocking keys 32 corresponding to all lower ordered blockers while reviewing a pair of records 10A, 10B for a selected blocker. The computer system 40 may compare the records 10A, 10B if matching blocking keys 32 are not present for lower ordered blockers. The computer system 40 may not compare the records 10A, 10B if matching blocking keys 32 are present for lower ordered blockers.

The decision to compare or not compare a pair of records 10A, 10B in the context of a current blocker in light of past blocker keys 32 prevents the system from completing significant numbers of computationally expensive comparisons. Instead, the computer system 40 may perform computationally cheap/simple review of blocker keys. This significantly reduces the time and computational power necessary to compare a large group of customer records 30 for linked records 12. Moreover, this allows many more blockers or focused blockers to be used in comparing the target records 30 without any fear of dramatically increasing the computational time due to duplicate comparisons.

By way of example, the computer system 40D may be analyzing customer records which would fall within focused group 34D associated with focused blocking key 32D. The computer system 40D may analyze the customer records 10A, 10B to determine which focused blocking keys 32 up to and including focused blocking key 32D pertain to the individual customer records 10A, 10B. By way of example, customer record 10A may pertain to focused blocking keys 32A, 32C, and 32D. Customer record 10B may pertain to focused blocking keys 32B, 32C, and 32D. The computer system 40D may compare the focused blocking keys 32 which pertain to the customer records 10A, 10B to determine if this pair of customer records have overlapping focused blocking keys 32 which are lower than focused blocking key 32D in the ordered list of focused blocking keys. In this example, customer records 10A, 10B share focused blocking key 32C. Computer system 40D would then discontinue analysis of records pair 10A, 10B as these records would be compared with each other in the context of focused blocking key 32C (i.e. by computer system 40C).

Comparison of these customer records 10A, 10B by computer system 40D would duplicate the efforts of computer system 40C and is not necessary. The comparison of customer records to identify linked records 12 is not made on the basis of the focused blocking keys, but is made on the basis of the data contained within the data fields 18 and is computationally expensive. The focused blocking keys 32 are used to identify customer records which are likely to provide a linked record 12.

By way of another example, customer record 10A may pertain to focused blocking keys 32A, and 32D. Customer record 10B may pertain to focused blocking keys 32B, 32C, and 32D. The computer system 40D may then compare the focused blocking keys 32 which pertain to the customer records 10A, 10B to determine if this pair of customer records have overlapping focused blocking keys 32 which are lower than focused blocking key 32D in the ordered list of focused blocking keys. In this example, customer records 10A, 10B do not share a lower focused blocking key 32, and only share focused blocking key 32D. Computer system 40D would then compare the customer records pair 10A, 10B to determine if they are linked records as these records would not be compared with each other in the context of a lower ordered focused blocking key 32.

In this manner, the computer system 40 may eliminate duplicate comparisons of customer records pairs. The computer system 40 may eliminate duplicate comparisons regardless of how many computers are comparing the target group 30 of customer records 10 and regardless of whether the comparison based on a lower ordered focused blocking key 32 has been completed or not. The computer system 40 may eliminate duplicate comparisons without communication between different computers, processors, or nodes and without terminating the analysis of the present pair of customer records and without consultation to a comparison log or the like.

Figure 7:
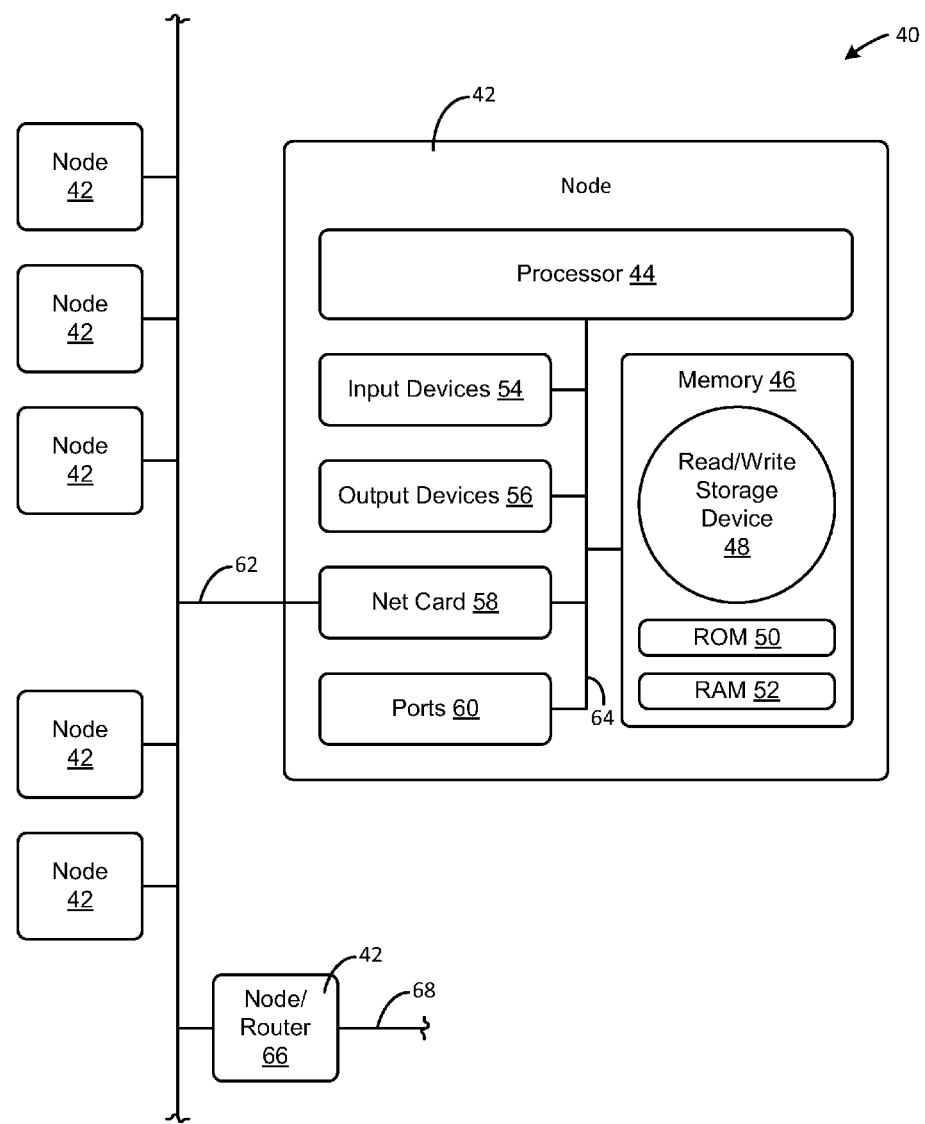
FIG. 7 is a schematic drawing of a computer system.

Referring to FIG. 7, a computer system 40 may provide, enable, or support multi-block overlap detection, focused multi-blocking, parallelization, or the like in any suitable manner. A computer system 40 may be embodied as hardware, software, or some combination thereof. In certain examples, a computer system 40 may comprise a single computer. In certain examples, a computer system 40 may comprise multiple processor units or multiple computers. For example, a computer system 40 may include one or more nodes 42.

A node 42 may include one or more processors 44, processor cores 44, or central processing units (CPUs) 44 (hereinafter "processors 44". Each such processor 44 may be viewed an independent computing resource capable of performing a processing workload distributed thereto. Alternatively, the one or more processors 44 of a node 42 may collectively form a single computing resource. Accordingly, individual workloads shares (e.g., group 30, focused group 34, records 10) may be distributed to nodes 42, to multiple processors 44 of nodes 42, or combinations thereof.

In selected examples, a node 42 may include memory 46. Such memory 46 may be operably connected to a processor 44 and include one or more devices such as a hard drive 48 or other non-volatile storage device 48, read-only memory (ROM) 50, random access memory (RAM) 52, or the like or a combination or sub-combination thereof. In selected examples, such components 44, 46, 48, 50, 52 may exist in a single node 42. Alternatively, such components 44, 46, 48, 50, 52 may be distributed across multiple nodes 42.

In selected examples, a node 42 may include one or more input devices 54 such as a keyboard, mouse, touch screen, scanner, memory device, communication line, and the like. A node 42 may also include one or more output devices 56 such as a monitor, output screen, printer, memory device, and the like. A node 42 may include a network card 58, port 60, or the like to facilitate communication through a computer network 62. Internally, one or more busses 64 may operably interconnect various components 44, 46, 54, 56, 58, 60 of a node 42 to provide communication therebetween. In certain embodiments, various nodes 42 of a computer system 40 may contain more or less of the components 44, 46, 54, 56, 58, 60, 64 described hereinabove.

Different nodes 42 within a computer system 40 may perform difference functions. For example, one or more nodes 42 within a system 40 may function as or be master nodes 42. Additionally, one or more nodes 42 within a system 40 may function as or be worker nodes 42. Accordingly, a system 40 may include one or more master nodes 42 distributing work to one or more worker nodes 42. In selected embodiments, a system 40 may also include one or more nodes 42 that function as or are routers 66 and the like. Accordingly, one computer network 62 may be connected to other computer networks 68 via one or more routers 66.

Figure 8:
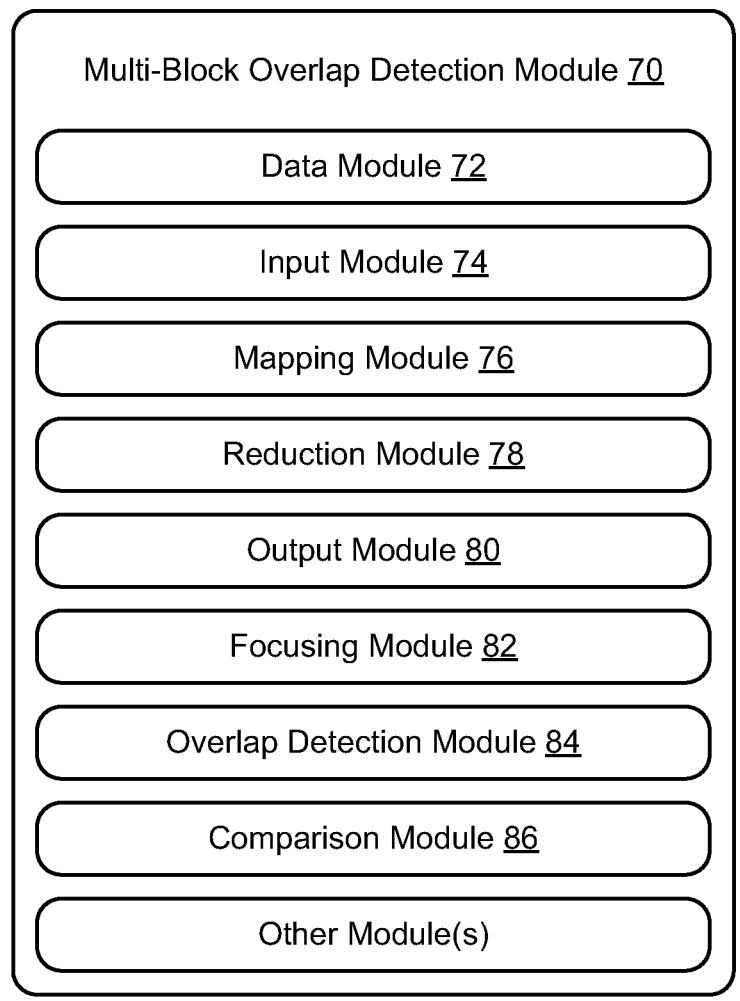
FIG. 8 is an illustration of a multi-blocking overlap detection module.

Referring to FIG. 8, a computer system 40 may process records 10 in any suitable manner. In selected embodiments, the nature of the hardware and/or software of a computer system 40 may reflect the specific processing to be performed. For example, a computer system 40 configured to compare and link records 10 may include a multi-blocking overlap detection module 70 providing, enabling, or supporting such functionality.

A multi-blocking overlap detection module 70 in accordance with the present invention may include any suitable arrangement of sub-components or modules. In certain embodiments, a multi-blocking overlap detection module 70 may include a data module 72, input module 74, mapping module 76, reduction module 78, output module 80, focusing module 82, overlap module 84, comparison module 86, one or more other modules as desired or necessary, or the like or some combination or sub-combination thereof.

In selected embodiments, certain components or modules of a multi-blocking overlap detection module 70 may be associated more with nodes 42 of a certain type. For example, a data module 72, input module 74, mapping module 76, reduction module 78, and output module 80 may be primarily or exclusively associated with one or more master nodes 42. Conversely, a focusing module 82 and comparison module 84 may be primarily or exclusively associated with one or more worker nodes 42.

A data module 72 may contain information supporting the operation of a multi-blocking overlap detection module 70. In selected embodiments, a data module 72 may contain or store one or more records 10. For example, a data module 72 may contain one or more records 10 comprising customer profiles from one or more sources. A data module 72 may also contain data, information, results, or the like produced by a multi-blocking overlap detection module 70 of one or more components or modules thereof. For example, a data module 72 may contain a list of blockers or focused blockers. A data module 72 may also contain linking information identifying which records 10 correspond to the same individual, household, or the like.

An input module 74 may generate, collect, extract, receive, communicate, and/or process any inputs (e.g., instructions, information, etc.) needed or used by a multi-blocking overlap detection module 70. For example, an input module 74 may receive a command or instruction to begin processing records 10. Accordingly, in selected embodiments, an input module 74 may be responsible for initiating a linking analysis or process. Alternatively, or in addition thereto, an input module 74 may collect, receive, extract, or communicate one or more records 10 that may be used or processed by one or more other components or modules of a multi-blocking overlap detection module 70.

A mapping module 76 may control the flow of instructions, records 10, keys, or the like or combinations or sub-combinations thereof from one or more master nodes 42 to one or more worker nodes 42. For example, a mapping module 76 may take an appropriate input, divide it into smaller sub-problems, and distribute them to a plurality of worker nodes 42. In selected embodiments, a mapping module 76 may enable one or more worker nodes 42 to take an input, divide it into smaller sub-problems, and distribute them to still other worker nodes 42, leading to a multi-level tree structure.

Once the various worker nodes 42 have finished processing their respective workloads, the results may be passed back to one or more master nodes 42. This process may be controlled or facilitated by a reduction module 78. Alternatively, or in addition thereto, a reduction module 78 may control the assimilation or reduction of the results produced by one or more worker nodes 42. That is, a reduction module 78 may collect the answers to all the various sub-problems and combine them in some way to form a desired output.

An output module 80 may generate, collect, compile, send, communicate, and/or process any outputs of a multi-blocking overlap detection module 70. For example, in selected embodiments, an output module 80 may receive linking information (e.g., from an reduction module 78), passing linking information to a data module 72 for storage, modify one or more records 10 in accordance with linking information, or the like or a combination or sub-combination thereof.

A focusing module 82 may receive focused blockers and may analyze customer records 10 from a group 30 of customer records 10 according to the focused blockers to produce focused blocking keys 32. The focusing module 82 may identify records 10 which correspond to the focused blocking key 32 and may create focused groups 34 containing records 10 corresponding to the particular focused blocking key 32.

An overlap detection module 84 may receive customer records from the target group 30 or a focused group 34 of customer records. The overlap detection module may order a number of blockers or focused blockers to place these blockers in a predetermined order such as a lexigraphical order. The overlap detection module may analyze a pair of customer records 10A, 10B in the context of a particular blocker to determine if those records pertain to that particular blocker (i.e. containing matched associated blocking keys), and may further analyze the pair of customer records 10A, 10B to determine if these records have matching blocking keys 32 pertaining to lower ordered blockers. If the pair of customer records 10A, 10B is associated with matching blocking keys 32 pertaining to a lower ordered blocker, the pair is not compared. If the pair of customer records 10A, 10B is not associated with matching blocking keys 32 pertaining to a lower ordered blocker, the pair is compared.

A comparison module 86 may receive customer records 10A, 10B which have matched blocking keys 32 pertaining to a selected blocker/focused blocker and compare the customer records to determine if the customer records are linked records 12. The comparison module 86 may receive customer records 10 from a target group 30 or focused group 34 and compare pairs of records 10 from within the group to identify linked records 12. Additionally, the multi-blocking overlap detection module 70 may include one or more other modules 86 as may be necessary or desirable to compare the records 10 and identify linked records 12.

Figure 9:
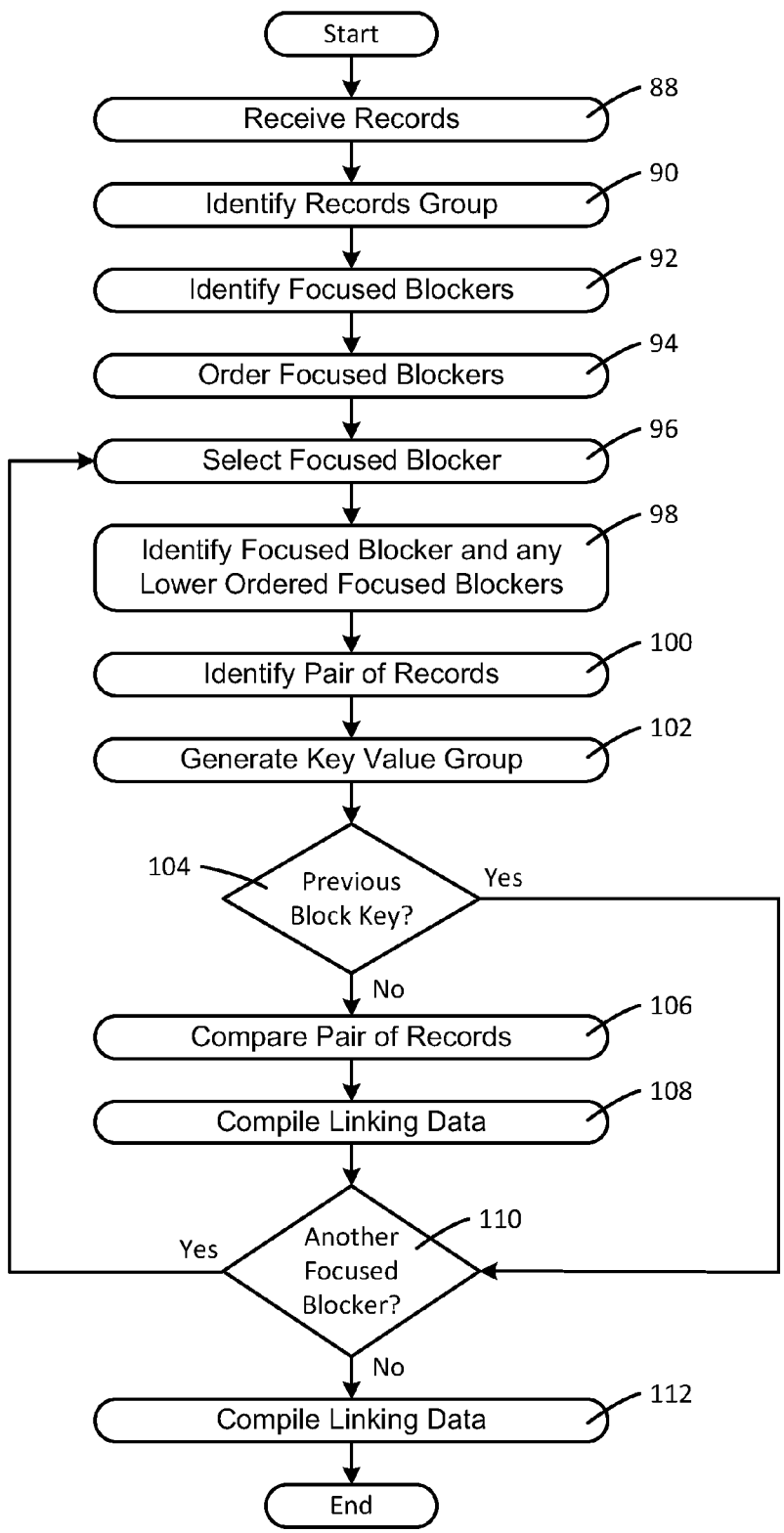
FIG. 9 is a flowchart illustration of comparing customer records.

Referring now to FIG. 9, a flowchart illustrating a computer system 40 comparing customer records 10 is shown. The flowchart in FIG. 9 illustrates the architecture, functionality, and operation of possible implementations of systems, methods, and computer program products according to certain examples. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A computer system 40 may receive 88 or identify customer records 10. These customer records 10 may include one or more groups 20, 22, 24, 26, 28 of customer records 10 which may be obtained from various different sources. It will be appreciated that, in some instances millions or even billions of records 10 may be present. The computer system 40 may identify 90 a target group 30 of records which is to be compared. The records group 30 may include all records 10 from available records groups 20, 22, 24, 26, 28 or may include a smaller subset of records, such as one group 26 according to the purpose in comparing the records 10. The target group 30 of records 10 may, in some examples, be a focused group 34 of records.

The computer system 40 may identify 92 one or more blockers and/or focused blockers (referred to simply as focused blockers). The focused blockers may be used in comparing the group 30 of records 10 to reduce the computational load and accurately provide linked records 12, both by eliminating comparisons of pairs of records which do not have matched blocking keys as well as by eliminating duplicate comparisons. The computer system 40 may then order 94 the focused blockers. The computer system may order 94 the focused blockers by lexigraphical order, alpha numeric order, etc. The order of the focused blockers may be used for subsequent analysis, such as in performing multi-blocking overlap detection.

The computer system 40 may then select 96 a focused blocker for use in analyzing the records 10. The computer system 40 may be working in parallel and the focused blocker may be one which has been assigned to the computer system. The computer system 40 may be working as a stand along unit and the focused blocker may be the next to be analyzed. The computer system 40 may identify 98 the focused blocker along with any lower ordered focused blockers (as referring to the order generated at 94). By way of example, if the computer system identifies focused blocker D, it would also identify lower ordered focused blockers C, B, and A.

The computer system 40 may identify 100 a pair of customer records 10A, 10B for analysis. The customer records 10A, 10B may be selected from the target group 30 of customer records 10. The computer system 40 may analyze the pair of records 10A, 10B to generate 102 a key value group. In generating a key value group, the computer system 40 may analyze each of the records 10A, 10B to identify focused blocking keys 32 from the relevant data fields 18 within each record 10A, 10B. The focused blocker may pertain to one or more identified data fields 18 within the customer records 10. As such, the computer system 40 may quickly analyze only the relevant data fields 18 (e.g. 18A, 18B, etc.) from a record 10A, 10B to identify any data contained within the data field 18 which matches the data value pertaining to the focused blocker. Any data which is pertinent to the focused blocker is identified as a focused blocking key 32.

The computer system 40 may then finish generating 1-2 the key value group. In an example, the focused value group may present a data string which includes the key value (focused blocker key) for the focused blocker presently being analyzed, the customer record identification, and any key values pertaining to lower order focused blockers. An example pair of customer records 10A, 10B may result in the following key value groups: (10004:123,Record10A,10004:Smith,8127, John@smithco.not) and (10004:123,Record10B,10004: Smith) or (10004:123,Record10B,10004:Smith,Null,Null).

The computer system 40 may then analyze the key value groups for customer records 10A, 10B to determine 104 if these key value groups share an identical previous block key 32, indicating that these customer records 10A, 10B would have been compared in the context of a lower order focused blocker. If the key value groups do not contain an identical focused blocking key 32 for a lower order focused blocker, the computer system 40 may compare 106 the records 10A, 10B to determine if these records should be identified as linked records 12 which both refer to a single customer entity. The comparison may be performed with Fuzzy logic or the like to accurately determine if the records 10A, 10B refer to a single customer entity even though misspellings or like errors or omissions may be present in the customer records 10A, 10B. If these records 10A, 10B both refer to a single customer entity, the computer system 40 may compile 108 linking data to create a record of the linked records 12, and may create a further record containing the combined information from the customer records 10A, 10B.

The computer system 40 may then determine 110 if another focused blocker remains for analysis. Similarly, if the computer system 40 previously determined 104 that the pair of records 10A, 10B did contain identical focused blocking keys 32 for a lower order focused blocker, the computer system 10 may proceed to determine 110 if another focused blocker remains for analysis. Where one computer, processor, or node is analyzing many focused blockers, that node may proceed to again select 96 a focused blocker and continue analyzing customer records 10. If no focused blockers remain, the computer system 40 may compile 112 linking data for the overall target group 30.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
a computer system identifying a target group of electronic customer records, each of the target group of electronic customer records having multiple data fields containing customer data;
the computer system identifying a plurality of blockers, each of the plurality of blockers identifying a target data field within the multiple data fields;
the computer system identifying a selected blocker and an additional blocker from the plurality of blockers, wherein the additional blocker is of a lower order than the selected blocker;
the computer system identifying a first electronic customer record and a second electronic customer record from the target group of electronic customer records;
the computer system analyzing the first electronic customer record to identify first potential blocker keys associated with the selected blocker and the additional blocker;
the computer system analyzing the second electronic customer record to identify second potential blocker keys associated with the selected blocker and the additional blocker;
the computer system comparing the first electronic customer record with the second electronic customer record to determine whether the first electronic customer record and the second electronic customer record pertain to a single customer entity when the computer system identifies a common blocker key corresponding to the selected blocker from the first electronic customer record and from the second electronic customer record and the computer system does not identify a common blocker key corresponding to the additional blocker from the first electronic customer record and from the second electronic customer record; and the computer system not comparing the first electronic customer record with the second electronic customer record to determine whether the first electronic customer record and the second electronic customer record pertain to a single customer entity when the computer system identifies a common blocker key corresponding to the selected blocker from the first electronic customer record and from the second electronic customer record and the computer system also identifies a common blocker key corresponding to the additional blocker from the first electronic customer record and from the second electronic customer record.

2. The method of claim 1, wherein the method further comprises the computer system not comparing the first electronic customer record with the second electronic customer record to determine whether the first electronic customer record and the second electronic customer record pertain to a single customer entity when the computer system does not identify a common blocker key corresponding to the selected blocker from the first electronic customer record and from the second electronic customer record.

3. The method of claim 1, wherein the method further comprises:
the computer system creating a first key value group, the first key value group comprising blocker keys corresponding to the first electronic customer record and corresponding to the selected blocker and the additional blocker;
the computer system creating a second key value group, the second key value group comprising blocker keys corresponding to the second electronic customer record and corresponding to the selected blocker and the additional blocker; and
wherein the method more specifically comprises the computer system comparing the first key value group and the second key value group to determine whether the computer system compares the first electronic customer record with the second electronic customer record.

4. The method of claim 1, wherein the computer system identifying a selected blocker and an additional blocker which is of a lower order than the selected blocker from the plurality of blockers more specifically comprises:
the computer system placing the plurality of blockers into an ordered list;
and the computer system identifying the selected blocker and an additional blocker which is of a lower order on the list than the selected blocker.

5. The method of claim 1, wherein the blocker keys comprise data values from an electronic customer record corresponding to a data field identified by a blocker.

6. The method of claim 1, wherein the selected blocker identifies a target data field comprising a double metaphone of a last name.

7. The method of claim 1, wherein the computer system compares the first electronic customer record with the second electronic customer record to determine whether the first electronic customer record and the second electronic customer record pertain to a single customer, a single household, or a single business.

8. The method of claim 1, wherein the computer system identifying a first electronic customer record and a second electronic customer record from the target group of electronic customer records more specifically comprises:
the computer system identifying, from the target group of electronic customer records, a first electronic customer record having a blocker key corresponding to the selected blocker, the blocker key comprising a data value corresponding to the target data field identified in a blocker; and
the computer system identifying, from the target group of electronic customer records, a second electronic customer record having a blocker key corresponding to the selected blocker which matches a first electronic customer record blocker key.

9. The method of claim 1, wherein the method further comprises:
the computer system identifying a third blocker from the plurality of blockers, which is different from the selected blocker and the additional blocker, and which is of a higher order than the selected blocker and the additional blocker;
the computer system identifying a third electronic customer record and a fourth electronic customer record from the target group of electronic customer records;
the computer system analyzing the third electronic customer record to identify potential blocker keys associated with the third blocker, the selected blocker, and the additional blocker;
the computer system analyzing the fourth electronic customer record to identify potential blocker keys associated with the third blocker, the selected blocker, and the additional blocker; and
the computer system comparing the third electronic customer record with the fourth electronic customer record to determine whether the third electronic customer record and the fourth electronic customer record pertain to a single customer entity when the computer system identifies a common blocker key corresponding to the third blocker from the third electronic customer record and from the fourth electronic customer record, the computer system does not identify a common blocker key corresponding to the selected blocker from the third electronic customer record and from the fourth electronic customer record, and the computer system does not identify a common blocker key corresponding to the additional blocker from the third electronic customer record and from the fourth electronic customer record.

10. The method of claim 1, wherein the selected blocker identifies a target data field comprising a first letter of a last name.

11. A computer system comprising one or more processors and one or more hardware memory devices operably connected to the one or more processors, the one or more hardware memory devices storing executable and operational code effective to cause the one or more processors to:
identify a target group of electronic customer records, each of the target group of electronic customer records having multiple data fields containing customer data;
identify a plurality of blockers, each of the plurality of blockers identifying a target data field within the multiple data fields;
identify a selected blocker and an additional blocker from the plurality of blockers, wherein the additional blocker is of a lower order than the selected blocker;
identify a first electronic customer record and a second electronic customer record from the target group of electronic customer records;
analyze the first electronic customer record to identify potential blocker keys associated with the selected blocker and the additional blocker;
analyze the second electronic customer record to identify potential blocker keys associated with the selected blocker and the additional blocker;

compare the first electronic customer record with the second electronic customer record to determine whether the first electronic customer record and the second electronic customer record pertain to a single customer entity if when the computer system identifies a common blocker key corresponding to the selected blocker from the first electronic customer record and from the second electronic customer record and the computer system does not identify a common blocker key corresponding to the additional blocker from the first electronic customer record and from the second electronic customer record; and not compare the first electronic customer record with the second electronic customer record to determine whether the first electronic customer record and the second electronic customer record pertain to a single customer entity when the computer system does not identify a common blocker key corresponding to the selected blocker from the first electronic customer record and from the second electronic customer record.

12. The computer system of claim 11, wherein the executable and operational code is effective to cause the one or more processors to not compare the first electronic customer record with the second electronic customer record to determine whether the first electronic customer record and the second electronic customer record pertain to a single customer entity when the computer system identifies a common blocker key corresponding to the selected blocker from the first electronic customer record and from the second electronic customer record and the computer system also identifies a common blocker key corresponding to the additional blocker from the first electronic customer record and from the second electronic customer record.

13. The computer system of claim 11, wherein the executable and operational code is effective to cause the one or more processors to:
create a first key value group, the first key value group comprising blocker keys corresponding to the first electronic customer record and corresponding to the selected blocker and the additional blocker;
create a second key value group, the second key value group comprising blocker keys corresponding to the second electronic customer record and corresponding to the selected blocker and the additional blocker; and
wherein the computer system is more specifically programmed to compare the first key value group and the second key value group to determine whether the computer system compares the first electronic customer record with the second electronic customer record.

14. The computer system of claim 11, wherein the executable and operational code is effective to cause the one or more processors to:
place the plurality of blockers into an ordered list; and
identify the selected blocker and an additional blocker which is of a lower order on the list than the selected blocker.

15. The computer system of claim 11, wherein the blocker keys comprise data values from an electronic customer record corresponding to a data field identified by a blocker.

16. The computer system of claim 11, wherein the selected blocker identifies a target data field comprising a double metaphone of a last name.

17. The computer system of claim 11, wherein the executable and operational code is effective to cause the one or more processors to compare the first electronic customer record with the second electronic customer record to determine whether the first electronic customer record and the second electronic customer record pertain to a single customer, a single household, or a single business.

18. The computer system of claim 11, wherein the executable and operational code is effective to cause the one or more processors to:
identify, from the target group of electronic customer records, a first electronic customer record having a blocker key corresponding to the selected blocker, the blocker key comprising a data value corresponding to the target data field identified in a blocker; and
identify, from the target group of electronic customer records, a second electronic customer record having a blocker key corresponding to the selected blocker which matches the blocker key of the first electronic customer record.

19. The computer system of claim 11, wherein the executable and operational code is effective to cause the one or more processors to:
identify a third blocker from the plurality of blockers, which is different from the selected blocker and the additional blocker, and which is of a higher order than the selected blocker and the additional blocker;
identify a third electronic customer record and a fourth electronic customer record from the target group of electronic customer records;
analyze the third electronic customer record to identify potential blocker keys associated with the third blocker, the selected blocker, and the additional blocker;
analyze the fourth electronic customer record to identify potential blocker keys associated with the third blocker, the selected blocker, and the additional blocker; and
compare the third electronic customer record with the fourth electronic customer record to determine whether the third electronic customer record and the fourth electronic customer record pertain to a single customer entity when the computer system identifies a common blocker key corresponding to the third blocker from the third electronic customer record and from the fourth electronic customer record, the computer system does not identify a common blocker key corresponding to the selected blocker from the third electronic customer record and from the fourth electronic customer record, and the computer system does not identify a common blocker key corresponding to the additional blocker from the third electronic customer record and from the fourth electronic customer record.

20. The computer system of claim 11, wherein the selected blocker identifies a target data field comprising a first letter of a last name.

* * * * *